United States Patent [19]
Lehmann et al.

[11] 3,711,609
[45] Jan. 16, 1973

[54] CERTAIN FURAZAN DERIVATIVES IN THERAPEUTIC COMPOSITIONS AND METHODS

[75] Inventors: Claude Lehmann; Ernest Renk; Andre Gazneux, all of Basel, Switzerland

[73] Assignee: Ciba-Geigy Corporation, Ardsley, N.Y.

[22] Filed: Oct. 15, 1970

[21] Appl. No.: 81,120

Related U.S. Application Data

[62] Division of Ser. No. 702,553, Feb. 2, 1968, abandoned.

[52] U.S. Cl...............................424/272, 260/307.7
[51] Int. Cl. ............................................A61k 27/00
[58] Field of Search ...................424/272; 260/307.7

[56] References Cited

OTHER PUBLICATIONS

Vianello, Chem. Abst. 23, 133$^5$ (1929).
Cusmano et al., Chem. Abst. 53 18010–11 (1959).

*Primary Examiner*—Stanley J. Friedman
*Attorney*—Karl F. Jorda and Bruce M. Collins

[57] ABSTRACT

The compounds are of the class of furazan derivatives, more particularly 4-amino-5-phenyl furazan derivatives wherein the phenyl ring is further substituted. The compounds are useful as anticonvulsive and muscle-relaxing agents and agents depressing the central nervous system (CNS). An illustrative embodiment is 3-amino-4-(2,6-xylyl) furazan.

6 Claims, No Drawings

CERTAIN FURAZAN DERIVATIVES IN THERAPEUTIC COMPOSITIONS AND METHODS

CROSS-REFERENCE TO RELATED APPLICATION

This is a division application of Ser. No. 702,553, filed Feb. 2, 1968, now abandoned.

DETAILED DISCLOSURE

The invention concerns new furazan derivatives and pharmaceutical preparations which contain the new compounds and the use thereof. More particularly the present invention relates to compounds of the general formula I

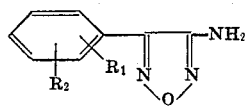

(I)

wherein
$R_1$ is hydrogen or lower alkyl and
$R_2$ is lower alkyl in o- or m- position.

Furthermore the present invention relates to novel methods and compositions containing a compound of the above-mentioned formula for effecting anticonvulsant, muscle-relaxing, and CNS-depressing activities in warm-blooded animals, especially mammals. More particularly, the method of effecting anticonvulsant, muscle-relaxing and CNS-depressing activities in mammals is concerned with administering a compound as defined in the above formula in therapeutic doses.

The term "lower alkyl" as used herein means straight or branched alkyl chains of the general formula $C_mH_{2m+1}$ wherein $m$ represents an integer of 5 or less. Illustrative of such alkyl groups are methyl, ethyl propyl, isopropyl, butyl, isobutyl, sec. butyl, tert. butyl, pentyl, isopentyl or the 2,2-dimethylpropyl. $R_1$ can be in the o-, m- or p-position.

The compounds of general formula I are produced according to the invention by reacting a compound of general formula II

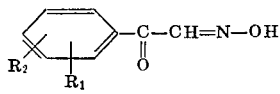

(II)

wherein $R_1$ and $R_2$ have the meanings given in formula I, or an alkali metal salt of such a compound with 2 mol equivalents of hydroxylamine.

Suitable alkali metal salts of compounds of general formula II are, e.g. sodium and potassium salts. The reaction is preferably performed in a solvent and in the presence of a condensing agent. Particularly suitable solvents are those containing hydroxyl groups such as low alkanols and water. Suitable condensing agents are e.g. alkali metal hydroxides such as sodium or potassium hydroxide, also alkaline earth metal hydroxides such as calcium or barium hydroxide, or carbonates corresponding to the alkali metal hydroxides mentioned. Preferably an excess of hydroxylamine is used as mineral acid salt, e.g. as hydrochloride, and the base is liberated by excess condensing agent.

Compounds of general formula II the radicals $R_1$ and $R_2$ of which conform to the groups explicitly mentioned after formula I as well as the alkali metal salts of such compounds are suitable as starting materials. These starting materials are produced, e.g. by reacting acetophenone substituted in the benzene nucleus by the radicals $R_1$ and $R_2$ with butyl nitrite in the presence of sodium ethylate in ethanol.

A compound of general formula I is produced by a second process according to the invention by reacting a compound of general formula III

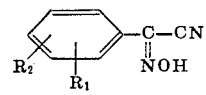

(III)

wherein $R_1$ and $R_2$ have the meanings given in formula I, or an alkali metal salt of such a compound, with 2 mol equivalents of hydroxylamine.

Suitable alkali metal salts of compounds of general formula III are, e.g. sodium and potassium salts. The reaction is preferably performed in a solvent and in the presence of a condensing agent. As solvents, particularly those containing hydroxyl groups such as low alkanols and water are used. Suitable condensing agents are, e.g. alkali metal hydroxides such as sodium or potassium hydroxide, also alkaline earth metal hydroxides such as calcium or barium hydroxide, or carbonates which correspond to the alkali metal hydroxides mentioned. Preferably, the hydroxylamine is used in excess as mineral acid salt, e.g. as hydrochloride, and the free base is liberated by excess condensing agent.

Compounds of general formula III the radicals $R_1$ and $R_2$ of which conform to the groups mentioned under formula I and also alkali metal salts of such compounds are suitable as starting materials. These starting materials are produced, e.g. by reacting phenyl acetonitrile substituted in the benzene nucleus by the radicals $R_1$ and $R_2$ with butyl nitrite in the presence of sodium ethylate in ethanol.

Compounds of general formula I are produced by a third process according to the invention by cyclizing a compound of general formula IV

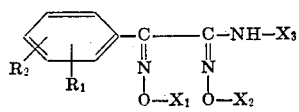

(IV)

wherein
$X_1$, $X_2$ and $X_3$ represent hydrogen or acyl radicals of an organic acid, particularly of a carboxylic acid, and
$R_1$ and $R_2$ have the meanings given in formula I, and, optionally, simultaneously hydrolyzing. As acyl radical of a carboxylic acid, each of $X_1$, $X_2$ and $X_3$ can be, e.g. the acetyl or benzoyl radical. The reaction is preferably performed in a solvent and in the presence of a condensing agent. When $X_1$ and/or $X_2$ are each the acyl radical of a carboxylic acid or is an acyl radical and $X_3$ is a hydrogen atom or the acyl radical of a carboxylic acid, particularly suitable condensing agents are alkali metal hydroxides such as sodium or potassium hydroxide, also alkaline earth metal hydroxides such as calcium or barium hydroxide or carbonates corresponding to the alkali metal hydroxides mentioned. These condensing agents are advantageously used in a solvent containing hydroxyl groups, e.g. in water or in a low alkanol such as methanol or ethanol. Another condensing agent which can be used is phosphorous oxychloride; it is preferably used when $X_1$, $X_2$ and $X_3$ are hydrogen atoms.

Examples of compounds suitable as starting materials are those of general formula IV the radicals $R_1$, $R_2$, $X_1$, $X_2$ and $X_3$ of which conform to the groups mentioned after the formulas I and IV.

A group of such compounds is obtained, e.g. as follows: phenyl glyoxime substituted in the benzene ring by the radicals $R_1$ and $R_2$ is used as starting material. This is reacted with chlorine in glacial acetic acid to form a corresponding phenyl chloroglyoxime derivative which, with benzoyl chloride in abs. benzene yields the corresponding O'-benzoyl-1-chloro-2-phenyl-glyoxime derivative.

The 1-chloro compound obtained is converted with 6N ammonia while splitting off hydrogen chloride into the O-benzoyl oxime of phenyl glyoxylamine oxime which is substituted in the benzene ring by the radicals $R_1$ and $R_2$.

According to another process the compounds of the general Formula I are produced, according to the invention, by reducing a compound of the general Formula Va or Vb.

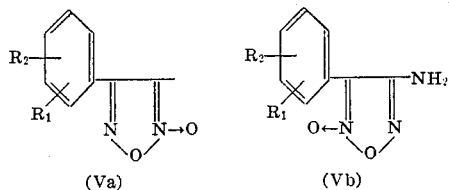

(Va)    (Vb)

wherein $R_1$ and $R_2$ have the meaning given above for Formula I.

The reduction is preferably carried out using zinc in dilute acetic acid or using stannous chloride in a mixture of acetic acid and hydrochloric acid. Acetic acid can serve as sole reaction medium or it may be diluted with organic solvents such as dioxan or a low molecular alkanol.

The starting material for this process, 3-amino-4-phenyl-furoxan having the general Formula Va can be prepared in a simple manner by oxidizing a 1-amino-2-phenyl-glyoxime which is substituted in its benzene nucleus by $R_1$ and $R_2$. Suitable oxidizing agents are aqueous solutions of halogens, such as bromine and chlorine or also potassium ferricyanide solutions. The 3-amino-4-phenyl-furoxans can also be prepared by reacting a phenylglyoxime whose benzene nucleus is substituted by $R_1$ and $R_2$ with ammonia and potassium ferricyanide in an aqueous solution.

The 3-amino-4-phenyl-furoxans of the general Formula Va thus obtained are transformed completely into the isomeric 4-amino-3-phenyl-furoxans, when heated or irradiated by ultra-violet light.

As pointed out above, the compounds of the present invention, i.e. compounds of the above-described general Formula I possess valuable pharmacological and therapeutic properties and may be used in the form of pharmaceutical compositions, especially as anticonvulsive, muscle-relaxing, and CNS-depressing agents. Consequently these compounds of Formula I can be used for the treatment of mild states of excitement and for the relief of muscular stiffness, e.g. rheumatic diseases, fibrositis, bursitis, myositis, spondylitis, disc lesions, and torticollis.

The toxicity of the compounds of the instant invention is low: for instance, the $LD_{50}$ of 3-amino-4-(3,4-xylyl) furazan administered orally to mice is higher than 5,000 mg/Kg, and the $LD_{50}$ of 3-amino-4-(o-tolyl) furazan is higher than 2,000 mg/Kg on oral administration to mice.

The muscle-relaxing and CNS-depressing activities were studied in the intact, anaesthetized cat by determining the monosynaptic patellar tendon reflex and the polysynaptic flexor reflex.

Procedure: Tracheotomy is performed on cats weighing 2.5 to 3 Kg under chloralose-urethane anaesthesia (chloralose 55 mg/Kg i.p. as a 3 percent solution in 21 percent urethane). The test substance in 5 percent propylene glycol solution is injected within 3 minutes into the jugular vein.

Patellar tendon reflex:

After the femur has been fixed, the contraction of the quadriceps femoris muscle of the right hind leg is induced by hitting the patellar tendon with an automatic hammer at 10 second intervals. The contraction is recorded isotonically. The maximum change in amplitude is determined as a percentage related to the amplitude of the muscle contractions before administration of the test compound.

Flexor reflex:

The contractions of the tibialis anterior muscle of the left hind leg are recorded isotonically after sub-maximal electrical stimulation of the central section of the severed tibial nerve. Sub-maximal stimulation is effected with single rectangular current impulses (Grass stimulator, duration or stimulation: 2 m sec., voltage 0.5 – 5.0 V). The interval between two stimulations is 10 seconds. The maximum change in amplitude is determined in percent related to the amplitude of the muscle contractions before administration of the test compound.

The results are given in the following table:

TABLE I

| Compound Administered | Dosage mg/Kg i.v. | Optimal change of amplitude in % | |
|---|---|---|---|
| | | Reflex of patellar tendon | Reflex of flexor |
| 3-amino-4-(o-tolyl) furazan | 8 | about 10 | about 100 |
| 3-amino-4-(2,6-xylyl) furazan | 9 | about 4 | about 100 |

The anticonvulsive activity of the compounds of the present invention are determined by means of the electroshock test (partial suppression).

Another characteristic property of the central muscle relaxants is their anticonvulsant effect. This effect of the test compound can be demonstrated as follows:

Male white rats weighing 120–150 g are used for the test. The electrodes are applied to the external ears. An alternating current of 50 c/s and 100 V is used for the electroshock and the stimulation lasts 0.63 seconds. The test compound is administered by mouth 1 hour before the electroshock. The dose which prevents tonic convulsions in the hind legs in 50 percent of the animals is ascertained by interpolation on the probability graph (Schleicher and Schüll No. 298½), (E.D.$_{50}$).

The results are given in the following table:

TABLE II

| Compound Administered | D.e.$_{50}$ in mg/Kg p.o. |
|---|---|
| 3-amino-4-(o-tolyl) furazan | about 50 |
| 3-amino-4-(2,6-xylyl) furazan | about 15 |

The compounds of the present invention may be used for the treatment of warm-blooded animals, particularly mammals, in form of pharmaceutical compositions containing the compounds in admixture or conjunction with a pharmaceutical organic or inorganic, solid or liquid carrier for oral, rectal, or parenteral administration. The total daily doses can vary from about 5 mg/Kg to about 100 mg/Kg, preferably about 10 mg/Kg to about 25 mg/Kg depending on the mammal and condition.

The preferred route of administration is the oral route. Suitable compositions include, without limitation, tablets, capsules, powders, solutions, suspensions, sustained release formulations and the like.

Dosage units for oral administration preferably contain between 60–90 percent of a compound of general formula I as active substance. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragee (sugar coated tablet) cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings e.g. to distinguish between different dosages of active substance.

Dosage units for rectal administration are e.g. suppositories which consist of a combination of the active substance with a suppository foundation mass. Suitable suppository foundation masses are natural or synthetic triglycerides, e.g. cocoa butter, also polyethylene glycols, e.g. Carbowax of suitable molecular weight, or higher fatty alcohols.

Dosage units for parenteral administration advantageously contain 1 – 10 percent active substance, water and also a solubility promoter or emulsifying agents, the following compounds for example can be used: propylene glycol, sodium benzoate or the sodium salt of a hydroxy-benzoic acid, water soluble salts of bile acids such as sodium dehydrocholate, morpholine desoxycholate, ethanolamine cholate, inosit-phosphatide preparations and lecithin preparations which have a low oil content, optionally with partial glycerides of higher fatty acids such as mono- or di- olein, and/or their polyoxyethylene derivatives. A dispersion of 1– 5 percent active substance, 10–25 percent polyoxyethylene derivative of ricinoleic acid or its glycerides, e.g. the commercial product Cremophor EL, is particularly suitable.

The following example further illustrates the production of tablets:

50.000 Kg of 3-amino-4-(3,4-xylyl)-furazan are mixed with 2.000 Kg of dried potato starch. The mass obtained is moistened with 1.200 Kg of stearic acid in 4 liters of ethanol and mixed for 15 minutes. 1.200 Kg of gelatine in 16 liters of distilled water are then added and the mass is kneaded for 20 minutes. As soon as it is sufficiently moist, it is granulated through a sieve (25 mesh/sq. cm) and dried. The dried granulates are again sieved (60 mesh/sq. cm) and then mixed for 1 hour with 4.000 Kg of potato starch 1.200 Kg of talcum and 0.400 Kg of sodium carboxymethyl cellulose. The mass obtained is pressed into 100,000 tablets each weighing 600 mg, of which each contains 500 mg of active substance.

The following examples illustrate the production of the new compounds of general formula I and of hitherto undescribed intermediate products but in no way limit the scope of the invention. The temperatures are given in degrees Centigrade.

EXAMPLE 1

First, 52.0 g of butyl nitrite and then 75 g of 3',4'-dimethyl-acetophenone are added to a solution of 11.6 g of sodium in 230 ml of abs. ethanol while cooling with ice. The mixture is left to stand for 3 hours in an ice bath, whereupon the solution of the sodium salt of (3,4-xylyl)-glyoxyalaldoxime solidifies into a gelatinous, reddish brown mass which is then left to stand for 16 hours at room temperature. The solvent is then evaporated in vacuo at a bath temperature of 30°–40°. The ethanol is removed from the residue by dissolving it three times in benzene and again evaporating the benzene in vacuo. 600 ml of water are then added to the solid residue whereupon a cloudy solution is formed. This solution is washed with ether in order to remove the red-brown, undissolved resins. The aqueous phase is separated, and 103 g of potassium hydroxide and 103 g of hydroxylamine hydrochloride are carefully added. The ether dissolved in the solution obtained is distilled off and the solution which remains is refluxed for 2.5 hours and cooled. Crystals precipitate which are filtered off, washed with water, dried in vacuo at 40° and recrystallized from isopropanol/methylene chloride. Pure 3-amino-4-(3,4-xylyl)-furazan is obtained which melts at 111°–113°.

EXAMPLE 2

First, 10.0 g of butyl nitrite and then 13.0 g of (2,6-xylyl)-acetonitrile are added to a solution of 2.13 g of sodium in 50 ml of abs. ethanol. The pale solution is stirred for 24 hours at room temperature and then evaporated to dryness in vacuo at a bath temperature of 40°. The ethanol is then completely removed from the residue by repeatedly dissolving it in 50 ml of benzene and again evaporating the solution in vacuo. The oily sodium salt of (2,6-xylyl)-glyoxylonitrile oxime obtained is dissolved in 150 ml of water, the solution is washed twice with ether and the aqueous phase is separated and 19.0 g of potassium hydroxide and 19.0 g of hydroxylamine hydrochloride are carefully added thereto. The solution obtained is brought to the boil, the ether dissolved therein is evaporated and the remaining solution is refluxed for 2.5 hours. On cooling, the precipitated oil crystallizes. The crystals are filtered off, washed with water and dried in vacuo. The crude product is recrystallized from cyclohexane/petroleum ether whereupon 3-amino-4-(2,6-xylyl)-furazan is obtained, M.P. 65°–66°.

EXAMPLE 3

The following compounds are obtained analogously to example 1:

a. from 2'-methyl-acetophenone with butyl nitrite in the presence of sodium ethylate, the sodium salt of (o-tolyl)-glyoxalaldoxime, from which, with hydroxylamine, the end product, 3-amino-4-(o-tolyl)-furazan, (M.P. 86°–88° from benzene/cylohexane), is produced, and b. from 3'-methyl-acetophenone, the sodium salt of (m-tolyl)-glyoxalaldoxime which is converted into the end product, 3-amino-4-(m-tolyl)-furazan, M.P. 76°–77°.

EXAMPLE 4

The following compounds are obtained analogously to Example 2:

a. from o-tolyl-acetonitrile with butyl nitrite and sodium ethylate, the sodium salt of (o-tolyl)-glyoxylonitrile oxime which, with hydroxylamine, yields the end product 3-amino-4-(o-tolyl)-furazan, (M.P. 86°–88° from benzene/cyclohexane), b. from m-tolyl-acetonitrile, the sodium salt of (m-tolyl)-glyoxylonitrile oxime which is converted into the end product, 3-amino-4-(m-tolyl)-furazan (M.P. 76–77), and c. from (o-ethylphenyl)-acetonitrile [cf. B. Van Zanten et al., Rec. trav. chim. 79, 1,211 (1960)], the sodium salt of (o-ethylphenyl)-glyoxylonitrile oxime which yields the end product 3-amino-4-(o-ethylphenyl)-furazan (M.P. 55°–56°, from benzene/benzine).

EXAMPLE 5

250 g of a furazan derivative of formula I, 175.8 g of lactose, and 169.7 g of potato starch are mixed, the mixture is moistened with an alcoholic solution of 10 g of stearic acid and granulated through a sieve. After drying, 160 g of potato starch, 200 g of talcum, 2.5 g of magnesium stearate and 32 g of colloidal silicon dioxide are mixed in and the mixture is pressed into 10,000 tablets each weighing 100 mg and containing 25 mg of the furazan derivative. If desired the tablets can be grooved to enable better adaptation of the dosage instructions.

EXAMPLE 6

50 mg to 300 mg of 3-amino-4-(3,4-xylyl) furazan are introduced into a two-piece gelatin No. 1 capsule.

EXAMPLE 7

A solution of 550 mg (3 millimol of) 3-amino-4-(o-tolyl)-furoxan in 50 ml acetic acid is added with 4.5 ml of $SnCl_2$ in acetic acid/hydrochloric acid (prepared according to Ber 50 (1917) 1539). This solution is left to stand for 48 hours at 20° and then evaporated to dryness. The residue is added with 25 ml of 5N aqueous sodium hydroxide under ice cooling and then it is extracted twice with 100 ml of ether. The ether phase is dried over potassium carbonate and evaporated to dryness. The residue crystallizes spontaneously and consists of 3-amino-4-(o-tolyl)-furazan melting at 86°–88°. This substance is identical with the one obtained in Example 3a)

The starting material, 3-amino-4-(o-tolyl)-furoxan was obtained as follows:

a. To an ice-cooled solution of 28,7 g of butylnitrite in 260 ml of 1N ethanolic sodium ethylate solution is added, while stirring vigorously a solution of 34 g (0.25 mol) of (o-tolyl)-acetonitrile. An exothermic reaction occurs which makes the temperature raise to about 40°. Stirring is continued for one hour. The reaction mixture is then filtered and the filtrate is evaporated to dryness. The filter residue and the evaporation residue are combined, dissolved in 200 ml of ice-water and washed with ether. The aqueous solution is then carefully acidified with 2N hydrochloric acid. A solid precipitates which is filtered, washed with water and dried. By recrystallizing it from chloroform, (o-tolyl)-glyoxylonitriloxime is obtained in 95 percent yield, which is used without purification.

b. A mixture consisting of 1.75 g (10 millimol) of (o-tolyl)-glyoxilonitriloxime, obtained in (a), 3,5 g (50 millimol) hydroxylamine and 4.2 g of sodium bicarbonate in 50 ml of water and 20 ml of methanol is heated for 4 hours at 60°. The solution is then evaporated to dryness and the residue is extracted twice with 100 ml of ether. The ether solution is washed with water, dried over sodium magnesium sulfate and evaporated to dryness. The residue is recrystallized from chloroform and gives in 75 percent yield crude 1-amino-2-(o-tolyl)-glyoxime, which is used without further purification.

c. 9.3 g Of the 1-amino-2-(o-tolyl)-glyoxime obtained in (b) are dissolved in 220 ml of ice cold 1N sulfuric acid and to this solution is added while stirring vigorously 220 ml of a 2-molar solution of bromine in water. A sticky yellow precipitate forms. The reaction mixture is added with 100 ml of cyclohexane and stirred for 5 minutes at room temperature, whereupon it is filtered. The residue is washed with water, dried and then dissolved in 250 ml of benzene. The benzene solution is dried over magnesium sulfate, filtered and evaporated to dryness. The residue is recrystallized from carbon tetrachloride and gives in 50 percent yield 3-amino-4-(o-tolyl)-furoxan melting at 121°.

EXAMPLE 8

A solution of 600 mg (3 millimol) of 3-amino-4-(3,4-xylyl)-furoxan in 30 ml of glacial acetic acid-dioxan 1:1 is added with 650 mg (10 millimol) of zinc-dust. The reaction mixture is stirred at room temperature for 18 hours and then filtered. The filtrate is concentrated to dryness. The residue is recrystallized from benzene and gives in 65 percent yield 3-amino-4-(3,4-xylyl)-furazan melting at 112°–114°. This substance is identical with the one obtained in Example 1 when comparing the NMR, UV and IR spectra and the thin-layer chromatograms.

The 3-amino-4-(3,4-xylyl)-furoxan used as starting material is obtained as follows:

a. 19.2 g of a mixture of α and β isomers of (3,4-xylyl)-glyoxime (see Example 7a) are dissolved in 200 ml of aqueous ammonia and while cooling in an ice bath and stirring vigorously a solution of 132 g (0.4 Mol) of potassium ferricyanide is added thereto. The reaction mixture is stirred for another 15 minutes and then filtered. The residue is washed with cold water and benzene. On recrystallizing it from 500 ml of chloroform pure 3-amino-4-(3,4-xylyl)-furoxan M.P. 121° is obtained in 45 percent yield.

By melting this substance or by boiling a solution thereof in toluene under reflux for 2 hours, it is rearranged quantitatively to the isomeric 4-amino-3-(3,4-xylyl)-furoxan, M.P. 110°, which can be reduced in the same way to 3-amino-4-(xylyl)-furazan.

What is claimed is:

1. A therapeutic composition for producing anticonvulsive, muscle-relaxing and CNS depressing effects comprising a pharmaceutical carrier and a therapeutically effective amount of a compound of the formula

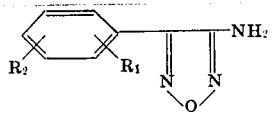

wherein
  $R_1$ is hydrogen or lower alkyl; and
  $R_2$ is lower alkyl in o- or m- position in dosage unit form acceptable for internal administration.

2. A composition as claimed in claim 1, wherein the compound is 3-amino-4-(2,6-xylyl) furazan.

3. A composition as claimed in claim 1, wherein the compound is 3-amino-4-(o-tolyl) furazan.

4. A method for treating a mammal suffering from convulsions comprising administering to said mammal an anti-convulsive effective amount of a compound as defined in claim 1.

5. A method for treating a mammal suffering from muscular stiffness comprising administering to said mammal a CNS-depressing effective amount of a compound as defined in claim 1.

6. A method for treating a mammal suffering from central nervous disorders comprising administering to said mammal a CNS-depressing effective amount of a compound as defined in claim 1.

* * * * *

PO-1050
(5/69)

UNITED STATES PATENT OFFICE
CERTIFICATE OF CORRECTION

Patent No. __3,711,609__   Dated __January 16, 1973__

Inventor(s) __CLAUDE LEHMANN ET AL__

It is certified that error appears in the above-identified patent and that said Letters Patent are hereby corrected as shown below:

Column 10, line 20, after "mammal a" delete "CNS-depressing" and insert -- muscle-relaxing --.

Signed and sealed this 19th day of February 1974.

(SEAL)
Attest:

EDWARD M.FLETCHER,JR.
Attesting Officer

C. MARSHALL DANN
Commissioner of Patents df